United States Patent

[11] 3,624,697

[72] Inventor William W. Fuller
424 Kingsway, Muskogee, Okla. 74401
[21] Appl. No. 8,252
[22] Filed Feb. 3, 1970
[45] Patented Nov. 30, 1971

[54] FORAGE PLOT HARVESTER
7 Claims, 1 Drawing Fig.
[52] U.S. Cl. .................................................. 56/16.6,
56/504, 56/156
[51] Int. Cl. .................................................. A01d 43/00
[50] Field of Search ........................................ 56/12.8,
12.9, 13.1, 13.2, 13.3, 13.4, 16.4, 16.6, 156, 504,
505, 294

[56] References Cited
UNITED STATES PATENTS

| | | | |
|---|---|---|---|
| 3,367,092 | 2/1968 | Gifford | 56/16.6 |
| 2,931,157 | 4/1960 | Smith et al. | 56/13.4 |
| 3,167,898 | 2/1965 | Gronberg | 56/16.5 |
| 3,242,658 | 3/1966 | Morales | 56/13.4 |
| 3,468,112 | 9/1969 | Landgrebe | 56/16.4 X |
| 3,084,493 | 4/1963 | Kucera | 56/294 |

Primary Examiner—Russell R. Kinsey
Attorney—Head & Johnson

ABSTRACT: A forage plot harvester including a vehicle, a flail mower, a vacuum device and a weighing container, the weighting container being connected through the vacuum device to receive forage cut by the mower for weighing selective cut forage increments.

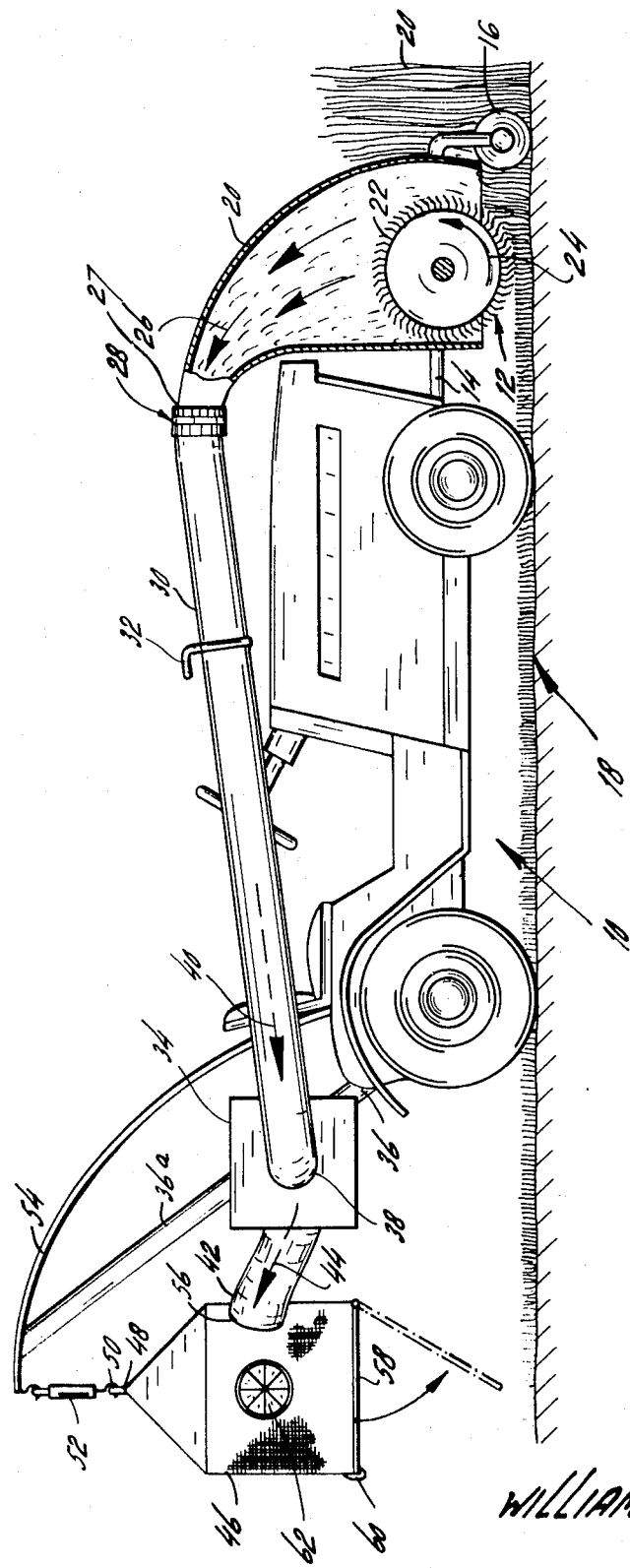

FORAGE PLOT HARVESTER

BACKGROUND OF THE INVENTION

Agricultural experimental stations are widespread in establishment and operation. A part of their work consists in taking samples of various grasses, grains and the like from experimental forage plots. Heretofore grasses from such forage plots have been cut by hand and loaded into sacks such as paper and weighed. No mechanical means have been devised or used in an attempt to cut down the labor and to accelerate the speed of this operation. A necessity for such apparatus to provide a quick, easy and practical method of harvesting forage plots is quite prevalent among experimental stations but no adequate solution has been found.

Previous efforts at solution of the problem utilized rotary mowers for cutting the grass following which a worker, following the mowing, would pick up the grass by hand, put it into a paper sack and weigh it. This was time consuming and necessitated two-man operation.

Difficulties were also encountered when harvesting forage having a high moisture content, such as small grains and certain types of grasses, which tend to stick to the sides of the mower housing. This is especially problematic in a rotary mower which throws forage outward with considerable force against the sides of the housing and the high moisture forages often built up large deposits inside the housing, thus giving a false reading for a specific plot due to nontransmission of the cut material to the weighing container or collection point.

In some previous apparatus tested for the present purpose in a mechanized system which would discharge forage cut by a rotary mower, cut was discharged into substantially nonporous types of containers. Under dusty conditions for example this produced undesirable results in that dust was also collected.

The present invention provides a solution to the needs and desires of those involved in harvesting forage plots and the present solution overcomes the problems and difficulties extant in prior known apparatus and systems.

SUMMARY OF INVENTION

A forage plot harvester including a mobile vehicle having a flail mower attached thereto and vacuum means operably opening into the discharge region of the mower, with a weighing container supported on the vehicle, and duct means interconnecting the discharge area of the mower and the weighing container through the vacuum means. The container is preferably porous, such as wire mesh, and is removably suspended from a weighing scale. A sample opening is provided in the container and a selectively operable discharge opening is incorporated therein. The duct means includes a flexible portion and is disconnectable from the mower and discharging into the duct means. A forage plot harvester including these components provides optimum results of forage harvesting from experimental plots and eliminates and overcomes drawbacks previously existing in this field of endeavor.

Additional objects and advantages of the present invention will be apparent from the following detailed description of an embodiment thereof when taken together with the accompanying drawing in which:

FIG. 1 is a schematic pictorial representation of the harvester of the present invention, portions being broken away for clarity.

The apparatus and system of the invention is readily applied to standard garden tractors of known types such as for example and 8 hp. version indicated generally at 10. A flail-type mower 12 is operably attached to the front end of the tractor as by frame 14 and supported by front wheels such as at 16. The mower is of a type permitting vertical adjustment for adjustment of cutting height. The turf of a plot to be harvested is generally indicated at 18 with forage to be harvested shown at 20. The tractor and mower operate in a standard known manner.

In accomplishing the desired operation of the harvester a generally curved housing 20 is supported by the frame over the flail mower 12 openly thereabove for discharge of cut material by the flail blades 22 which are upwardly cup shaped in the direction of rotation indicated by arrow 24. Housing 20 is in effect a collecting hood having no sharply angular changes of configuration or restriction therein which might tend to obstruct free flow of cut forage therethrough. The mower 12 is of course power driven in a known manner such as from a power takeoff from the tractor or other means known in the art.

The flail-type mower presents substantial advantages over other types such as rotary mowers in being able to cut much heavier and denser forage. Forages such as the Hybrid Sudans, dense alfalfa stands, and heavy stands of tall native grasses can all be harvested easily with such a mower. Harvesting of these types of forages is very difficult, if not impossible, with rotary mowers. Another advantage of the flail mower is that the many flails cut the forage into many small pieces which enhances their being picked up by the vacuum means incorporated in the invention and also facilitates drying of any required samples.

When the flails are adjusted properly the curved flail blades rotate upward, each acting as a miniature scoop and, as well as cutting the forage, it also throws it upward into the upper portion of the curved chute portion of the housing as indicated by arrows 26.

The discharge end 27 of the housing chute 20 has detachably connected thereto such as by means of a slip fitting indicated at 28 a conduit or duct 30. A handle attachment 32 is provided on duct 30 and is usable when the duct is disconnected from discharge 27 to permit movement of the duct for collecting cut material apart from that discharged from the housing such as in discharged piles or the like as will be further discussed hereinafter.

Vacuum means include a vacuum device or blower of a known type such as for example a 4 hp. vacuum type pneumatic pump generally indicated at 34 mounted on the rear end of the tractor by framework 36 and can if desired be readily detachable therefrom. The rearward end of duct 30 is attached to the inlet side of the vacuum device at 38. The vacuum device is separately power driven and upon operation creates a vacuum in duct 30 to draw cut forage from the housing 20, through duct 30 as indicated by arrow 40 and into and through a flexible discharge duct 42 connected to the outlet of vacuum device 34. The direction of flow of the forage through the flexible discharge duct 42 being as indicated by arrow 44. The duct 42 can be detachably connected with vacuum device 34 in any suitable manner.

In order to collect and weigh forage material cut from a plot, the collection device preferably used consists of a wire mesh box 46 detachably supported through ring 48 on hook 50 of a weighing scale 52. The weighing scale in turn is detachably supported, as shown, by means of boom 54 or the like which can additionally be supported by frame extension 36. Obviously other support means and mountings can be utilized. The discharge end of duct 42 is detachably connected at 56 into the interior of the box for discharge thereinto of cut forage material.

A hinge bottom 58 and securing latch 60 are provided on the box to permit collected forage to drop out of the box. A slotted, rubber covered window 62 is incorporated in a side of the box to permit removal of required forage samples from the box.

The mesh size of the box is sufficiently small to stop particles of cut forage and at the same time permit all dust and dirt particles picked up by the vacuum to be blown through the mesh. The entire box is suspended from the scale which in operation is adjusted to account for the weight of the box. When a plot has been cut, the harvester is stopped, and the weight of the cut forage can be read directly from the scale and recorded immediately. After any required samples are removed, the bottom latch is tripped to open the box allowing the forage to drop out of the box. The discarded material can be later removed from the plot areas by disconnecting the duct 30 at slip fitting 28, using the handle attachment 32 to manipulate the duct over desired areas. If desired, during this operation, the box 46 can be disconnected and the discharge end or duct 42 can be used to discharge material into a trailer, any desired container, or into a collection area adjacent to the plot.

In operation it is found that with the flail mower cutting the forage into small pieces and throwing it upward into the upper curvilinear portion of the curved chute which does not have any abrupt change direction, that when the throwing force is dissipated the pulling force of the vacuum has taken over and serves to pull the pieces of cut forage back to the collection point with substantial ease, thus ensuring a more thorough "pick up" of the chopped material.

While a single embodiment of the invention has been shown and described herein, manifestly minor changes in details can be included within the apparatus without departing from the spirit and scope of the invention as defined in and limited solely by the appended claims.

I claim:
1. A forage harvester and weighing machine, comprising:
 a self-propelled vehicle;
 a mowing means supported to said vehicle;
 vacuum means for collecting forage cut by said mowing means;
 a weighing container supported to said vehicle having connection to said vacuum means for receiving cut forage therein; and
 scale means interposed between said vehicle and said weighing container whereby the weight of forage cut and deposited in said container is indicated.

2. A forage harvester and weighing machine according to claim 1 wherein said scale means includes a scale suspended from said vehicle and wherein said weighing container is suspended from said scale.

3. A forage harvester and weighing machine according to claim 1 wherein said weighing container is formed of wire mesh of an opening size to prevent passage therethrough of cut forage and permit passage therethrough of dust or dirt collected and deposited therein by said vacuum means.

4. A forage harvester according to claim 1 wherein said weighing means has a latchable hinged bottom therein to permit discharge of material from said container.

5. A forage harvester according to claim 1 wherein said weighing container has a slotted rubber window in a side thereof adapted for removal of samples of forage collected therein.

6. A forage harvester according to claim 1 wherein said mowing means includes a flail type mowing means.

7. A forage harvester according to claim 1 wherein said vacuum means includes a vacuum device having an inlet and an outlet, and including:
 a housing partially encompassing said mowing means;
 a conduit communicating said housing with said vacuum device inlet; and
 a discharge duct connecting the vacuum device outlet with said weighing container.

* * * * *